United States Patent [19]

Wesbecher

[11] 4,203,705

[45] May 20, 1980

[54] BONDED TURBINE DISK FOR IMPROVED LOW CYCLE FATIGUE LIFE

[75] Inventor: James J. Wesbecher, Glastonbury, Conn.

[73] Assignee: United Technologies Corporation, Hartford, Conn.

[21] Appl. No.: 906,306

[22] Filed: May 15, 1978

Related U.S. Application Data

[63] Continuation of Ser. No. 643,737, Dec. 22, 1975, abandoned.

[51] Int. Cl.² ............................................. F01D 5/08
[52] U.S. Cl. .................................... 416/95; 416/244 A
[58] Field of Search ................ 416/92, 95, 96, 244 A, 416/97 R

[56] References Cited

U.S. PATENT DOCUMENTS

| | | | |
|---|---|---|---|
| 2,613,058 | 10/1952 | Atkinson | 416/95 |
| 2,641,440 | 6/1953 | Williams | 416/95 |
| 3,429,700 | 2/1969 | Wiegand et al. | 416/213 |
| 3,982,852 | 9/1976 | Andersen et al. | 416/95 |

FOREIGN PATENT DOCUMENTS

| | | | |
|---|---|---|---|
| 1476732 | 6/1970 | Fed. Rep. of Germany | 416/95 |
| 1318256 | 5/1973 | United Kingdom | 416/95 |

*Primary Examiner*—Everette A. Powell, Jr.
*Attorney, Agent, or Firm*—Robert C. Walker

[57] ABSTRACT

A coolable disk structure which is capable of extended use in the turbine section of a gas turbine engine is disclosed. Various construction details which improve the service life of the disk are developed. Techniques which provide positive control of the heating and cooling rates in turbine disks are incorporated in the structure to increase the low cycle fatigue life of the disk by optimizing the disk thermal profile.

2 Claims, 10 Drawing Figures

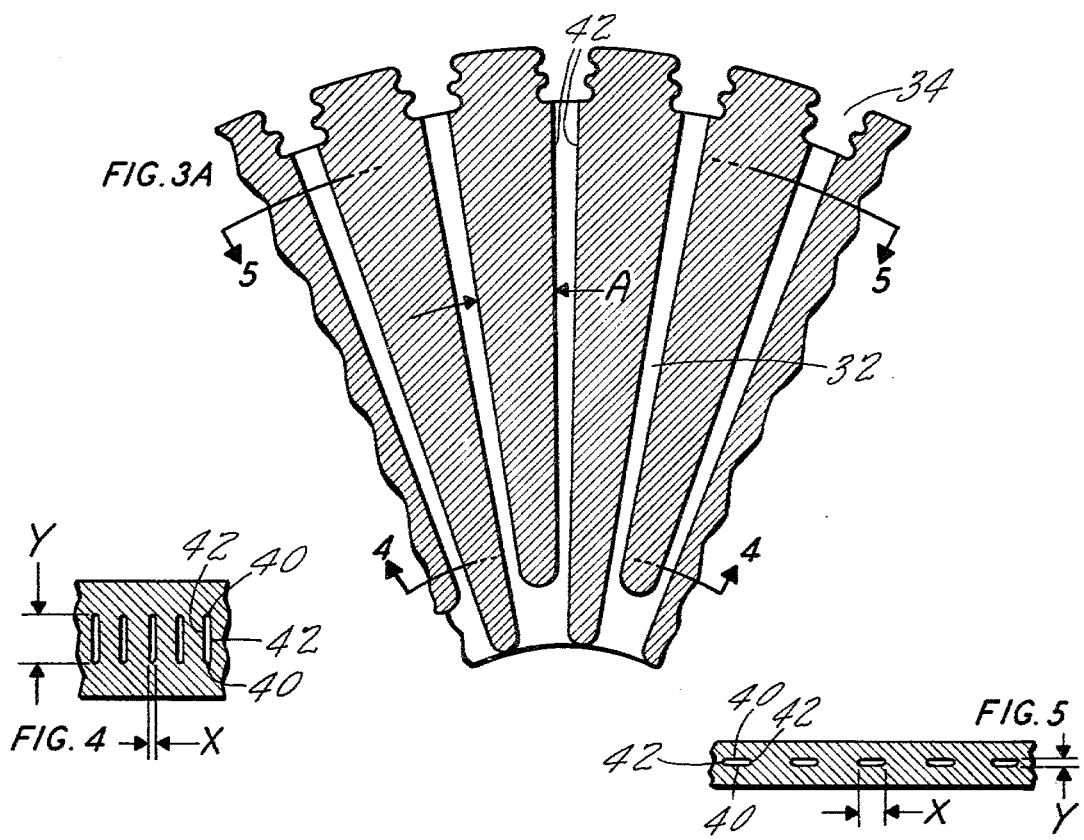
FIG. 3A
FIG. 4
FIG. 5
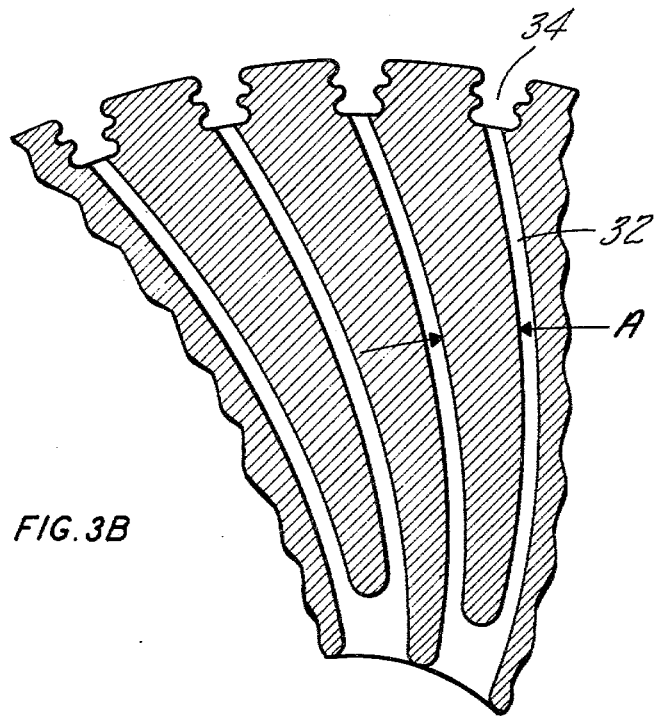
FIG. 3B

BONDED TURBINE DISK FOR IMPROVED LOW CYCLE FATIGUE LIFE

This is a continuation of application Ser. No. 643,737, filed Dec. 22, 1975, now abandoned.

BACKGROUND OF THE INVENTION

1. Field of the Invention

This invention relates to turbine machines and particularly to rotor disks of gas turbine engines.

2. Description of the Prior Art

The gas turbine engine is typical of turbine machines in which the concepts described herein may be advantageously employed. In a gas turbine engine pressurized air and fuel are burned in a combustion chamber to add thermal energy to the medium gases flowing therethrough. The effluent from the chamber comprises high temperature gases which are flowed downstream in an annular flow path through the turbine section of the engine. The high temperature gases of the effluent induce radial thermal gradients across the components of the engine. The gradients exist both inwardly and outwardly of the flow path and are responsive to temperature and flow rate variations of the medium in the flow path. The thermal gradients across each individual turbine component are dependent upon both the position of the component relative to the flow path and of the influence which turbine cooling systems exert upon that component.

The gradients in a turbine rotor disk develop radially across the disk from the rim, which is located nearly adjacent the flow path, to the disk bore, which is located remotely from the flow path. In an uncooled disk the rim responds more rapidly to deviations in the flow path thermal characteristics than does the bore. Resultantly, the thermal profile between the rim and the bore is altered with each significant variation in a thermal characteristic. Each alteration in thermal profile causes a corresponding change in the disk thermal stress. The time period bracketing each stress peak, such as is illustrated in FIG. 7, is known as a "stress cycle". In each aircraft engine the combination of all stress cycles experienced by a component from aircraft takeoff through landing is termed "flight cycle".

Fatigue failure as a result of stress cycling adversely limits the life of components such as rotor disks. The minimum surface life expected is, according to industry standards expressed in terms of "low cycle fatigue life". The low cycle fatigue life for a rotor disk of an aircraft turbine engine is the minimum number of aircraft flight cycles to which the disk may be exposed without experiencing fatigue failure. As discussed above, the fatigue life of a disk is a function of all the individual stress cycles within a flight cycle. The low cycle fatigue life of a component is, then, calcuable as follows.

$$1/N = 1/N_1 + 1/N_2 + 1/N_3 + \ldots$$

where

N is the low cycle fatigue life expressed in flight cycles;

$N_1$ is the low cycle fatigue life based upon the first stress cycle;

$N_2$ is the low cycle fatigue life based upon the second stress cycles; and $N_3$ is the low cycle fatigue life based upon the third stress cycle.

The number of stress cycles in each flight cycle varies according to the mission of the aircraft, but for a gas turbine engine in one typical commerical flight cycle the number of significant stress cycles is three. The first stress cycle occurs on takeoff; the second stress cycle occurs during climb to cruise; and the third stress cycle occurs after engine deceleration on descent. The effect of each stress cycle upon the overall low cycle fatigue life is largely dependent upon the magnitude of the included stress excursion or, in other words, the difference between the maximum and minimum stresses within each stress cycle. Additional factors such as the duration of individually imposed stresses also effect the fatigue life of the disk. The magnitude of the stress excursion in the first stress cycle, however, generally predominates.

In most modern gas turbine engines secondary flow systems are operative in the turbine region to cool various components including rotor blades. The cooling systems inherently cause variations in the thermal gradients imposed upon a disk by the medium gases of the flow path. Blade cooling systems such as that shown in U.S. Pat. No. 3,742,706 to Klompas entitled "Dual Flow Cooling Turbine Arrangement for Gas Turbine Engines" have directed cooling air through a rotor disk to interior cavities of the blades mounted peripherally upon the disk. Coolant passages in rotor disks such as that shown in Klompas have not, however, been contoured for optimum cooling of the rotor disk.

Substantial efforts are currently underway to provide rotor disk cooling which optimizes stress patterns during operation of the engine by reducing the number of stress cycles in each flight cycle and reducing the magnitude of the remaining stress excursions.

SUMMARY OF THE INVENTION

A primary object of the present invention is to provide a coolable rotor disk with improved low cycle fatigue life. A reduction in the number of stress cycles to which a rotor disk is subjected during each flight cycle and a decrease in the magnitude of the remaining stress excursions are goals. In one aspect of the invention, objects are to closely couple the thermal response of the disk bore and rim by providing varied local heat transfer rates along coolant conduits, and to maintain the rim temperature in excess of the bore temperature throughout each expected flight cycle.

According to the present invention internal cooling conduits of a rotor disk structure are contoured to establish local heat transfer rates which produce a preferred radial thermal profile in the disk during operation, wherein said profile includes a first region of nearly constant temperature running from the disk bore towards the rim and a second region of substantially elevated temperature at the disk rim.

A primary feature of the present invention is the cooling conduits of the disk which are formed, from grooves configured into the abutting faces of the disk front and rear elements, as the elements are cooperatively aligned and joined. The local heat transfer characteristics provided in the cooling conduits are varied by contouring the size and shape of the conduits. The local heat transfer rates are tailored to produce a radial thermal profile in the operating disk which approximates the profile shown in FIG. 8. The region of substantially elevated temperature shown in FIG. 8 at the disk rim produces a compressive thermal stress in the disk rim which offsets a centrifugally generated, tensile hoop stress in the disk during operation.

A principal advantage of the apparatus constructed in accordance with the present invention is increased low cycle fatigue life. Thermal gradient reversals within the disk are limited and the magnitude of the combined thermal and mechanical stress excursions is reduced. The elimination of stress cycles and the reduction in the magnitude of stress excursions increase the low cycle fatigue life. Engine cycle effectiveness is improved through the utilization of excess coolant capacity in the cooling air which is conventionally flowed to the turbine blades. In still another aspect of the invention a reduction in the weight of the disk structure is allowed by a decrease in thermal stress levels.

DESCRIPTION OF THE DRAWING

FIG. 3A is a sectional view taken along the line 3—3 as shown in FIG. 2 illustrating a first alternate internal configuration of the disk;

FIG. 3B is a sectional view taken along the line 3—3 as shown in FIG. 2 illustrating a second alternate internal configuration;

FIG. 4 is a sectional view taken along the line 4—4 as shown in FIG. 3A;

FIG. 5 is a sectional view taken along the line 5—5 as shown in FIG. 3A;

DESCRIPTION OF THE PREFERRED EMBODIMENT

Figure 1:
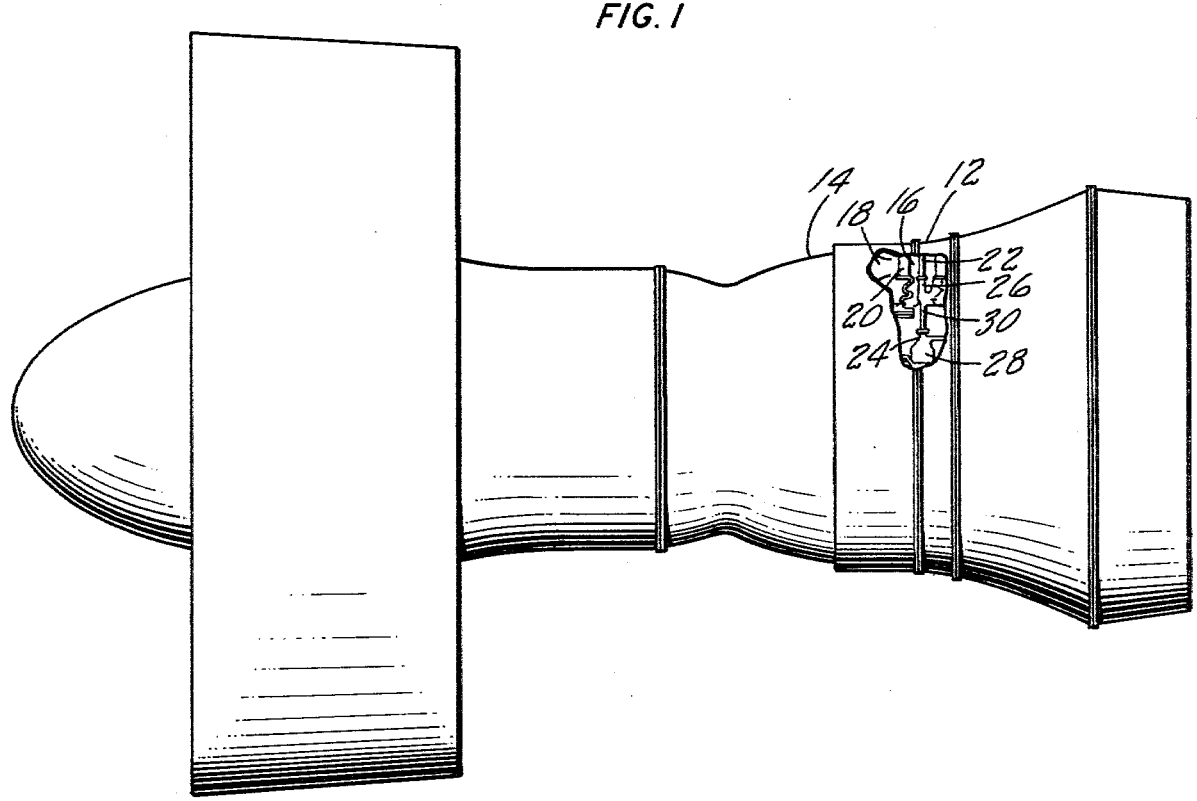
FIG. 1 is a simplified side elevation view of a turbofan, gas turbine engine having a portion of the turbine section broken away to reveal a turbine disk in cross section.
Figure 2:
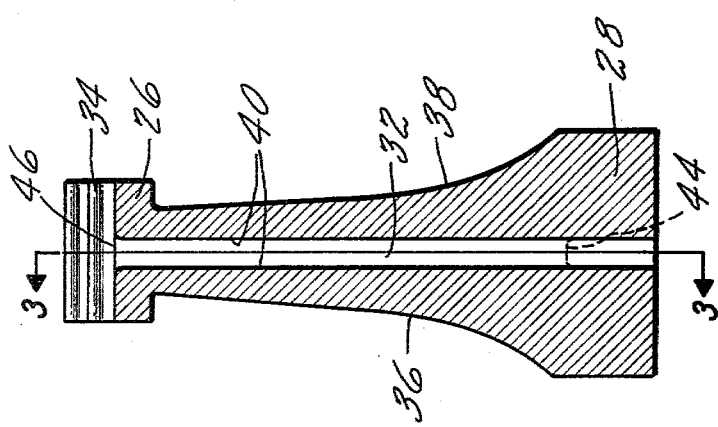
FIG. 2 is a simplified cross section view of a turbine disk constructed in accordance with the present invention.

The turbofan, gas turbine engine shown in FIG. 1 is typical of turbine machines in which the concepts described herein may be advantageously employed. In the engine a turbine section 12 is positioned downstream of a combustion section 14. A flow path 16 carries hot effluent from the combustion chamber 18 through the turbine section. A row of stator vanes as represented by a single vane 20 is disposed across the flow path. The row of stator vanes directs the effluent at a preferred angle onto a row of rotor blades which is represented by the single blade 22. The rotor blades are mounted peripherally on a rotor disk 24 which has a rim 26 and a bore 28. The distance between the rim and the bore is spanned by a web 30. Referring to FIG. 2, cooling air to the rotor blades is flowable in a radially outward direction through a conduit 32 in the web. The most outward portion of the rim having circumferentially continuous material which is uninterrupted by peripheral indentations, such as blade loading slots 34, is referred to as the "live rim". Each disk is formed of a front member 36 and a rear member 38 which are metallurgically bonded together by a suitable joining technique such as brazing or diffusion bonding. The conduits 32 are formed during the joining process as grooves configured into the abutting faces of the front and rear members are aligned. Each conduit 32 is bound by a pair of axial side walls 40 and a pair of circumferential side walls 42. The circumferential walls are viewable in FIG. 3. An inlet aperture 44 to each conduit is provided in the bore region and an outlet aperture 46 is provided in the rim region. At least one outlet aperture opens into each blade loading slot 34.

Over the flight cycle of the engine, the disk rim 26 and the disk bore 28 are exposed to diverse thermal environments. The rim, being adjacent to the hot effluent to the flow path 16, tends to respond quickly to changes in the effluent flow rate and temperature. Conversely, the bore which is well spaced from the effluent tends to respond more slowly to such changes. This lag in response is further encouraged by the mass to surface area ratio of the disk in the bore region which is large in comparison to the same ratio in the rim region. The apparatus of the preferred embodiments contemplated herein is specifically adapted and tailored to maintain the temperature in the bore region at a value which is less than the rim temperature under all conditions of the flight cycle.

Figure 8:
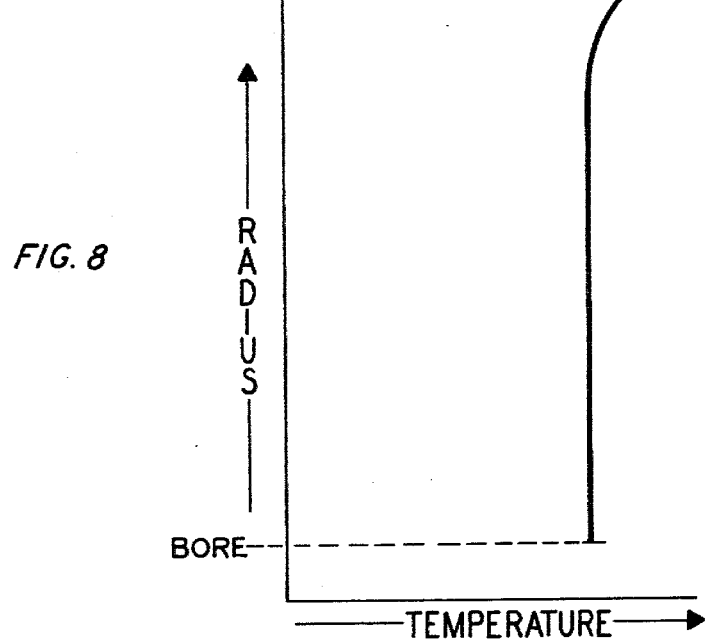
FIG. 8 is a thermal profile graph showing the preferred relationship of the temperature of the disk material during operation to the disk radius.

A preferred radial thermal gradient for the disk material is shown in FIG. 8. In an initial zone as the radius increases along the vertical axis of the graph from the bore to the rim, the preferred temperature remains essentially constant. Although the magnitude of the temperature in the initial zone may vary with operational changes during the flight cycle, the nearly constant radial temperature profile remains and damaging thermal gradient reversals across the disk are avoided.

In a second zone at the live rim of the disk, a substantial temperature rise is desired under all operating conditions. The substantial temperature rise places the disk rim in thermal compression as thermal expansion of the rim material is restrained by the cooler web and bore. Thermal compression produces circumferential, compressive stresses which desirably offset centrifugally generated, tensile hoop stress in the rim of the operating disk. The magnitude of the temperature rise in any particular construction depends upon the maximum net mechanical and thermal stress levels desired at the rim. In one construction a fifty degree Fahrenheit (50° F.) temperature rise proved to be effective, although a greater or lesser rise producing a comparable thermal profile is considered to be within the teaching of this disclosure.

Figure 6:
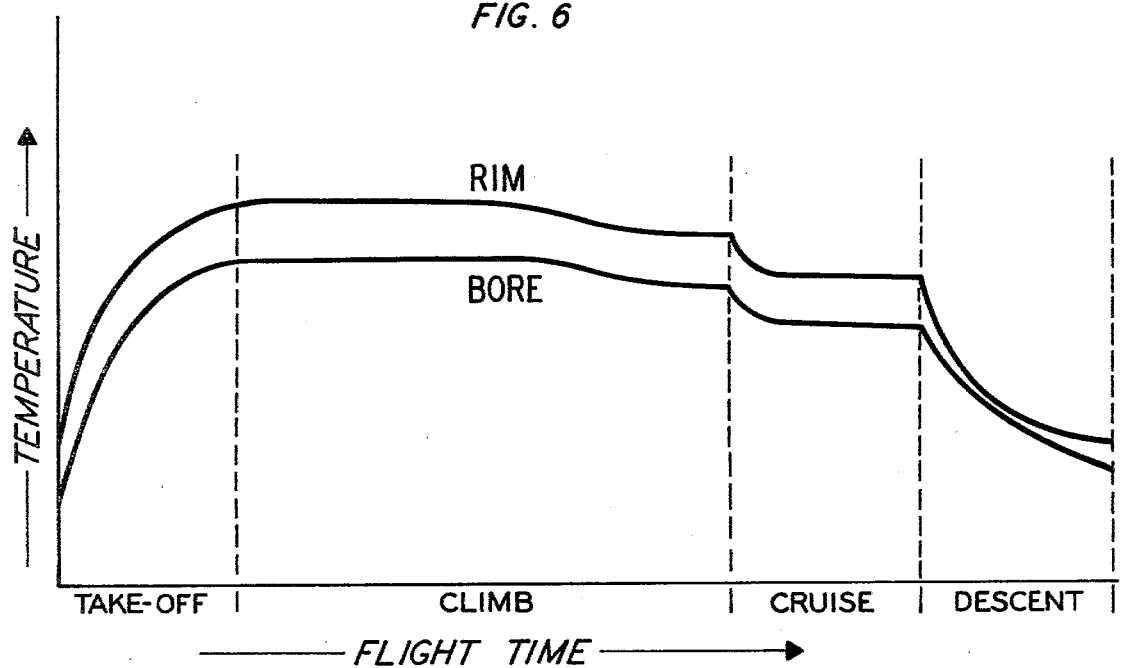
FIG. 6 is a graph of the disk temperature versus flight cycle showing a typical comparative relationship between the rim temperature and the bore temperature.
Figure 7:
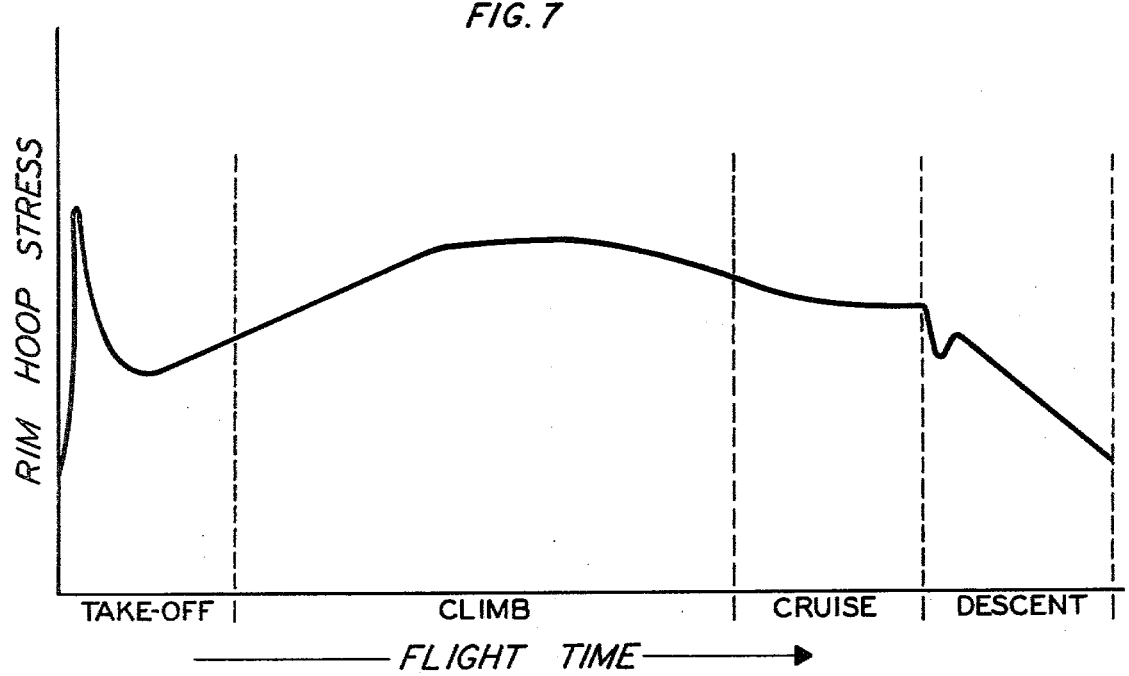
FIG. 7 is a graph of a rim hoop stress versus flight cycle.

The effect of the preferred thermal profile of FIG. 8 is graphically displayed in FIGS. 6 and 7. In FIG. 6 the temperature of the bore and rim are plotted for one engine as a function of the flight cycle. One noticeable feature illustrated is that the temperature of the rim never falls below the temperature of the bore and, consequently, thermal reversals are not present. Even during engine deceleration upon descent, where the temperature of the effluent in the flow path is reduced sharply, the temperature at the bore remains below the temperature at the rim.

Maintenance of the substantial temperature rise at the live rim without thermal reversals controls the magnitudes of the stress excursions throughout the flight cycle and in some cases substantially eliminates a stress cycle. In the case depicted by the FIG. 7 graph, the third stress cycle has a nearly inconsequential effect on the low cycle fatigue life when compared to the third stress cycle of an engine experiencing thermal gradient reversals.

Figure 3:
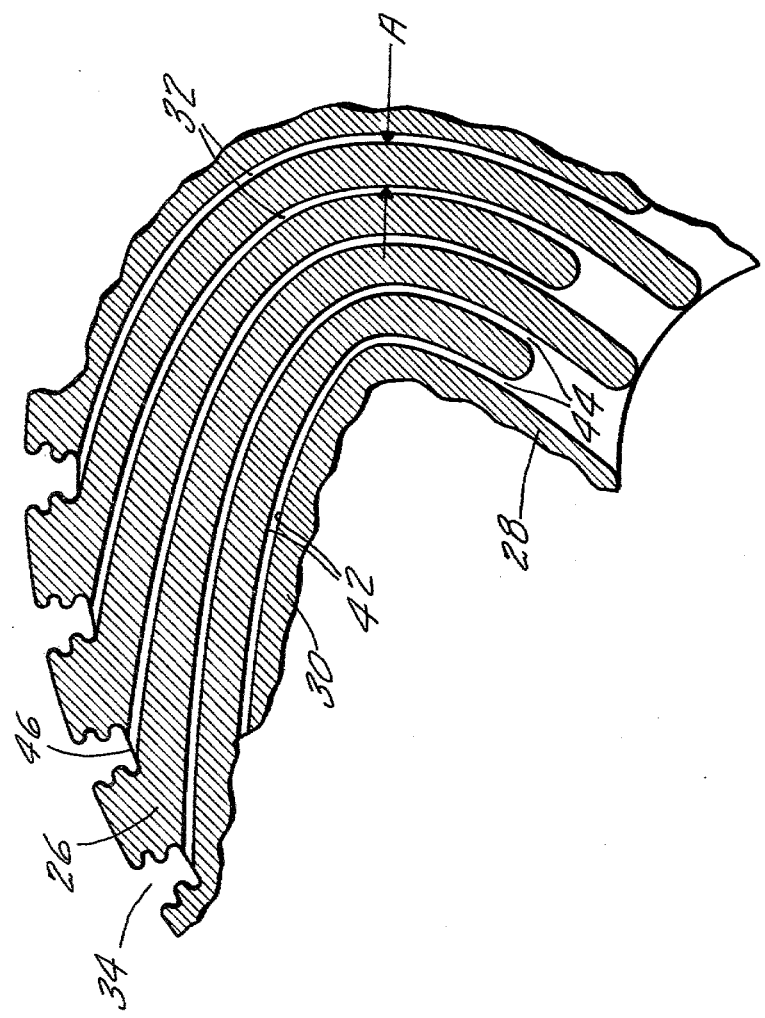
FIG. 3 is a sectional view taken along the line 3—3 as shown in FIG. 2.

FIGS. 3, 3A and 3B are illustrative of conduit placement variations which may be incorporated to alter the heat removal rates in the various regions of the disk. In FIG. 3 the cooling conduits 32 extend from the bore 28 to the rim 26. The inlet aperture 44 is positioned at the bore and the outlet aperture 46 is positioned at the live rim. Each outlet aperture opens into a blade loading slot 34. Each conduit is oriented relative to the adjacent conduits in a manner providing an essentially constant material thickness (A) between the conduits at each radial location. Maintaining a constant material thickness relationship as the radial location increases, standardizes the length of the heat flow paths to the conduits and minimizes the otherwise severe circumferential gradients in the radially outward portion of the web.

An alternate construction having a material thickness (A) which increases in proportion to the radius is shown in FIG. 3A. A disk having a construction as shown in 3B has a material thickness (A) between adjacent conduits which moderately increases according to radius. The placements of the cooling conduits as shown in FIGS. 3, 3A and 3B are shown herein to illustrate the types of placement which may be employed in the practice of the present invention. For each individual rotor disk the material thickness may be increased or decreased with radial position to effect the preferred rate of heat removal which will maintain, during operation, the thermal profile of FIG. 8.

Consistent with the concepts taught herein, the local heat transfer rates are tailored along each conduit by decreasing the conduit area to accelerate the cooling medium in regions where higher transfer rates are required to conform the metal temperature to the FIG. 8 preferred profile. Conversely, increasing the conduit area decelerates the cooling medium in regions where lower heat transfer rates are required to conform the metal temperature to the FIG. 8 preferred profile.

Conduits having tapered side walls, such as the tapered circumferential side walls 42 shown in FIG. 3A, are utilized in some constructions either to increase the heat transfer surface area in a constant flow area conduit, or to minimize the adverse stress concentrations within the disk which are caused by incorporation of the conduits. In one specific geometry, a double taper is contemplated wherein the axial side walls converge with each increase in radius and wherein the circumferential side walls diverge with each increase in radius. This construction is illustrated in FIGS. 4 and 5 wherein the circumferential width (X) of each conduit is greater at the rim than at the bore and wherein the axial width (Y) is greater at the bore than at the rim.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. For a gas turbine engine a rotor disk of the type having a bore and a live rim of circumferentially continuous material, wherein the rotor disk is formed of a front member and a rear member which are metallurgically joined in an adjacent relationship and includes means formed between the front and rear members for providing a thermal profile characteristic to the disk, including a first region of nearly constant temperature running from the bore toward the live rim and a second region of substantially elevated temperature at the live rim and wherein said means for providing said thermal profile characteristic includes cooling conduits which are curved with increasing radius from the bore to the rim to maintain a substantially uniform material thickness therebetween.

2. The apparatus according to claim 1 wherein said means for providing the thermal profile characteristic includes means for providing a profile characteristic having an elevated temperature of approximately fifty degrees at the live rim.

* * * * *